United States Patent [19]
Trussell et al.

[11] 4,108,362
[45] Aug. 22, 1978

[54] VEHICLE DIAGNOSIS DATA ENTRY SYSTEM

[75] Inventors: Gerald C. Trussell, Park Ridge; Robert W. Arnston, Schaumburg, both of Ill.

[73] Assignee: Sun Electric Corporation, Chicago, Ill.

[21] Appl. No.: 763,338

[22] Filed: Jan. 28, 1977

[51] Int. Cl.² .................. G01L 3/26; G01R 13/42; G06K 7/00
[52] U.S. Cl. .................................. 235/375; 73/116; 324/15
[58] Field of Search .................. 73/116, 117.2, 117.3; 235/61.7 R, 61.7 B, 61.11 E, 61.11 D, 61.12 M, 61.12 N; 360/2; 340/334, 337; 364/424, 461, 511; 324/15, 16 R

[56] References Cited

U.S. PATENT DOCUMENTS

| | | | |
|---|---|---|---|
| 3,697,729 | 10/1972 | Edwards | 235/61.7 B |
| 3,935,427 | 1/1976 | Gevl | 73/116 |
| 3,960,011 | 6/1976 | Renz | 73/116 |
| 3,970,803 | 7/1976 | Kinzie | 360/2 |
| 3,974,496 | 8/1976 | Aptroot-Soloway | 340/337 |
| 3,981,002 | 9/1976 | Gardner | 340/334 |
| 3,983,550 | 9/1976 | Goss | 340/334 |
| 3,997,917 | 12/1976 | Kihara | 360/2 |
| 4,006,403 | 2/1977 | Olsen | 73/116 |

Primary Examiner—Robert M. Kilgore
Attorney, Agent, or Firm—Allegretti, Newitt, Witcoff & McAndrews

[57] ABSTRACT

The disclosure describes an analyzer controlled by a microprocessor having a memory for diagnosing a vehicle engine. Engine specifications are read into the analyzer by a card bearing: (1) specifications of the engine printed in alpha-numeric form; and (2) a machine-readable code representing a portion of the specifications. A code reader reads the code on the card and converts it into electronic digital signals. The digital signals are converted to a form usable by the microprocessor so that the specifications can be stored in the memory. During analysis, information can be written on the card and stored for use during a subsequent analysis.

7 Claims, 2 Drawing Figures

VEHICLE DIAGNOSIS DATA ENTRY SYSTEM

BACKGROUND AND SUMMARY OF THE INVENTION

This invention relates to engine analyzers and more particularly relates to apparatus for reading engine specifications into an analyzer and for storing information produced by the analyzer.

Quite recently, a vehicle engine analyzer employing a microprocessor and memory has been developed. This analyzer is described in detail in U.S. Application Ser. No. 641,362 filed in the name of Cashel et al on Dec. 16, 1975, now abandoned.

Another piece of automotive diagnostic equipment known as "Autosense" has been developed by the Hamilton Standard Division of the United Technologies. In the Autosense system, information needed to test automobiles, including specifications, is stored on a tape cassette. The tape cassette is operated in order to read electronic signals into the system. After the system is connected to a vehicle engine, it produces a printout which shows whether various vehicle engine parameters are greater than or less than the specification limits stored on the tape cassette.

Experience has shown that storage of engine specifications on a tape cassette has a number of disadvantages. The information stored on the cassette is not in visible form and, therefore, cannot be interpreted by an operator of the system. In addition, the cassettes are more bulky to store than many other record-bearing media. If specifications for more than one vehicle are stored on a single tape, it is difficult for the operator of the system to locate the proper portion of the tape which pertains to the vehicle being diagnosed.

Accordingly, it is an object of the present invention to provide a media for specifications which can be read by a human operator as well as automatic analyzing equipment.

Another object of the invention is to provide a media of the foregoing type which can be stored easily and which bears specifications for only a single type of vehicle which can be identified easily.

Still another object of the invention is to provide a system of the foregoing kind in which the machine-readable code is automatically converted into electronic digital signals which can be rapidly stored in the memory of the microprocessor.

Yet another object of the invention is to provide a media of the foregoing type on which a machine-writable code can be stored.

By using the foregoing techniques, information can be stored and read into a computerized engine analyzer with a degree of accuracy and convenience heretofore unavailable. According to a preferred aspect of the invention, the engine specifications for a single type of vehicle are carried on a sheet in two forms:

(1) Conventional printed alpha-numeric form which can be read by an operator; and (2) Machine-readable code which can be converted automatically to digital signals storable in the memory of a microprocessor.

The use of this technique offers a number of advantages. By storing the specifications on a sheet in conventional printed alpha-numeric form, the operator can quickly identify the vehicle to be diagnosed and can read for himself the specifications. While the engine analyzer is performing automatic phases of the diagnosis, the operator can use the sheet specifications for manual engine performance checking. By storing the operator-readable and machine-readable specifications on the same sheet, the record-keeping requirements of the operator are cut in half. In addition, by limiting the specifications to one vehicle type per sheet, the operator can easily locate the machine-readable specifications which are needed for the analyzer.

According to another feature of the invention, the engine analyzer writes information pertaining to analysis on the sheet in machine-readable form. The sheet provides a convenient means of storing the information for use during subsequent analysis.

DESCRIPTION OF THE DRAWINGS

These and other objects, advantages and features of the present invention will hereafter appear in connection with the accompanying drawings wherein like numbers refer to like parts throughout, and wherein.

DESCRIPTION OF THE PREFERRED EMBODIMENT

Figure 1:
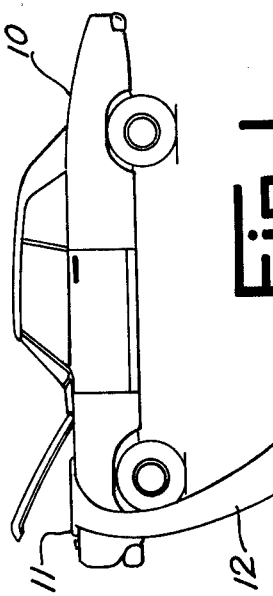
FIG. 1 is a block diagram illustrating a preferred form of the present invention.

Referring to FIG. 1, the present invention can be used in connection with a conventional vehicle 10 having an internal combustion engine 11. Portions of the engine, such as the ignition system, are connected to an analyzer 14 by means of a cable system 12. Analyzer 14 may take the form of the 2001 analyzer manufactured by Sun Electric Corporation, Chicago, Illinois. This analyzer is disclosed in the above-identified Cashel et al application Ser. No. 641,362. As disclosed in this application, analyzer 14 includes a microprocessor having a digital memory. Data may be read into the microprocessor memory by means of a communications controller 16, such as Model NS717 manufactured by Sun Electric Corporation, Chicago, Illinois. Controller 16 receives digital signals from a read/write coding device 18, such as Series 700 optical mark reader manufactured by Data I/O Corporation, Issaquah, Washington 98027. Device 18 is capable of reading an optically-visible code on a strip 19 of a sheet 20. Device 18 converts the visible marks or bars 21 of strip 19 into electronic digital signals which are transmitted to communications controller 16.

Figure 2:
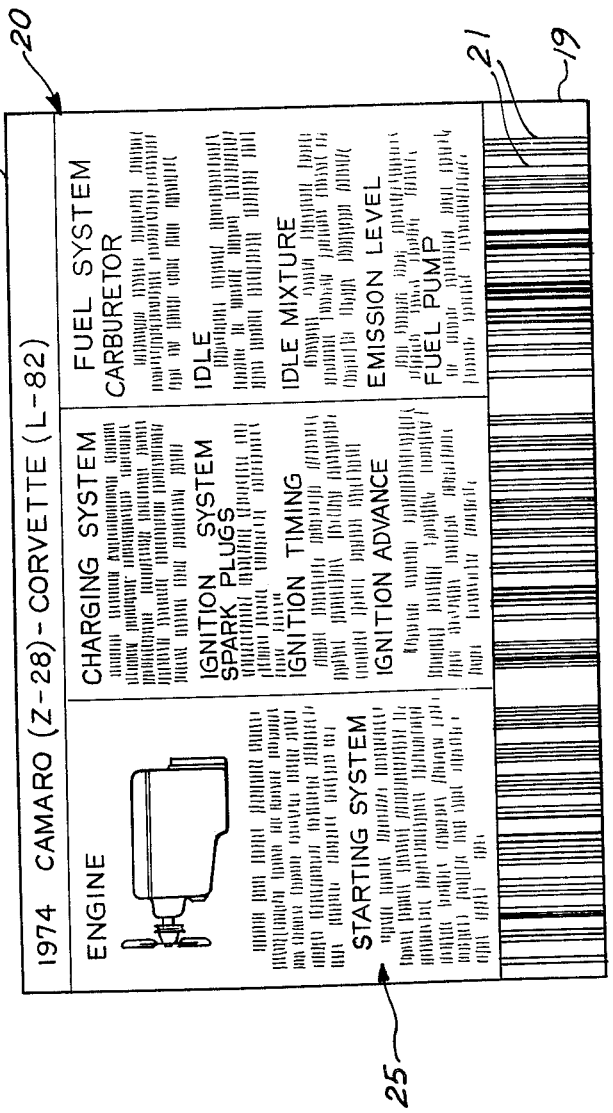
FIG. 2 is a detailed diagram illustrating a preferred form of the sheet shown in FIG. 1.

Referring to FIG. 2, sheet 20 contains a title strip 23 which identifies the type of vehicle for which specifications are printed in alpha-numeric form in a body 25 of the sheet. As shown in FIG. 2, the body of the sheet includes information on the engine; starting system; charging system; ignition system; including spark plugs, ignition timing and ignition advance; and the fuel system, including the carburetor, idle, idle mixture, emission level, and fuel pump. At least a portion of the specifications printed in the body of the sheet are encoded by bars 21 on strip 19.

By entering sheet 20 into reader 18, the specifications encoded in strip 19 are converted automatically to digital signals which are put into a form usable by analyzer 14 in communications controller 16. Thus, the specifications are automatically read into the memory of the microprocessor of analyzer 14 where they are available for use in the diagnosis of engine 11. Sheet 20 preferably is made from heavy paper, although other pliable substances could be used.

In place of the optical mark reader, read/write coding device 18 may take the form of a magnetic strip read/write device, such as Model 211, manufactured by AMP Incorporated, Harrisburg, Pennsylvania, in combination with a conventional automatic card feed mechanism. In this embodiment, strip 19 would comprise a magnetic film or tape on which a code could be recorded by conventional tape recording techniques. Of course, the magnetic code also could be erased. Strip 19 could contain the same type of information described above.

In order to use this feature, the operator would insert sheet 20 partially into the card feed mechanism and signal to the system, by means of a switch, that the sheet is in position to be read. The feed mechanism then would move the sheet into the magnetic device, and the information recorded on strip 19 would be converted into electronic digital signals which are transmitted to communications controller 16.

Upon completion of the engine tests by the analyzer, information could then be recorded on strip 19 of the sheet under the control of controller 16. The information recorded on strip 19 in coded form could include:

(1) The total number of times engine 11 was tested;

(2) Average readings for certain key engine parameters (e.g., dwell, timing, battery draw, etc.);

(3) The most frequent type of repairs required on engine 11; and (4) User modification of an engine specification according to a change by the engine manufacturer. By having summary data written to strip 19 on sheet 20 the user could gain valuable experience as more of the same type of engines are analyzed, and could predict the most common problems with better confidence and accuracy.

Entry of commands to write data to strip 19 on sheet 11 can be facilitated by the addition of an alpha-numerical keyboard connected as an auxiliary device to communications controller 16.

Those skilled in the art will recognize that the described embodiments can be modified without departing from the true spirit and scope of the invention as defined in the appended claims.

What is claimed is:

1. In an analyzer controlled by a digital processor having a memory for analyzing a vehicular engine, improved apparatus for reading data into the analyzer comprising:

a sheet bearing specifications of the engine printed in alpha-numeric form and bearing a machine-readable digital code representing at least a portion of the specifications;

coding means for reading said digital code on the sheet and for converting the digital code into electronic digital signals; and communication means for transmitting the digital signals to the engine analyzer in a form usable by the engine analyzer, whereby the specifications can be read into the memory of the analyzer.

2. Apparatus, as claimed in claim 1, wherein the machine-readable code comprises a series of visible marks.

3. Apparatus, as claimed in claim 2, wherein the code reading means comprises an optical mark reader.

4. Apparatus, as claimed in claim 2, wherein the sheet is fabricated from paper.

5. Apparatus, as claimed in claim 4, wherein the specifications represented in machine-readable form are limited to a single type of vehicle and wherein the sheet identifies said single type of vehicle in alphabetic form.

6. Apparatus, as claimed in claim 1, wherein the machine-readable code comprises a series of signals stored in a magnetic medium.

7. Apparatus, as claimed in claim 6, wherein the coding means further comprises means for erasing the magnetic medium and means for recording code signals on the magnetic medium.

* * * * *